United States Patent
Patterson et al.

[15] 3,706,345
[45] Dec. 19, 1972

[54] TOOL MOUNTING MEANS FOR AGRICULTURAL IMPLEMENTS

[72] Inventors: Roger Lee Patterson, Fonthill; Henning Isachsen, Merritton, Ontario, both of Canada

[73] Assignee: Deere & Company, Moline, Ill.

[22] Filed: July 22, 1970

[21] Appl. No.: 57,115

[52] U.S. Cl. ................................. 172/572, 172/711
[51] Int. Cl. ..................... A01b 35/28, A01b 39/20
[58] Field of Search......172/579, 264, 705, 711, 462, 172/482, 491, 572, 570, 687, 668, 264, 599

[56] References Cited

UNITED STATES PATENTS

| | | | |
|---|---|---|---|
| 3,405,767 | 10/1968 | Thompson | 172/711 X |
| 2,798,419 | 7/1957 | Moriceau | 172/572 |
| 3,529,676 | 9/1970 | Moe et al. | 172/572 |
| 2,756,662 | 7/1956 | Christensen | 172/462 X |
| 2,616,352 | 11/1952 | Johnston | 172/482 |
| 2,669,171 | 2/1954 | Silver et al | 172/462 |

*Primary Examiner*—Robert E. Pulfrey
*Assistant Examiner*—Stephen C. Pellegrino
*Attorney*—H. Vincent Harsha, Harold M. Knoth, William A. Murray, Raymond L. Hollister and John M. Nolan

[57] ABSTRACT

An apparatus for resiliently mounting an elongated gang of disks on the frame of an agricultural implement, including an elongated tubular member having a pair of arms fixed to its ends and extending outwardly therefrom, the gang of disks being supported on the outer ends of the arms; a shaft rotatably mounted on the frame and extending axially through the tubular member; a U-shaped torsion bar contained within the tubular member and acting between the tubular member and shaft for biasing the former, and thereby the gang of disks, downwardly about the latter; and a pair of upper and lower stops defining the range of movement of the tubular member about the shaft. A hydraulic ram is operable to rotate the shaft and thereby raise and lower the gang of disks relative to the frame.

16 Claims, 5 Drawing Figures

INVENTORS
ROGER L. PATTERSON
HENNING ISACHSEN

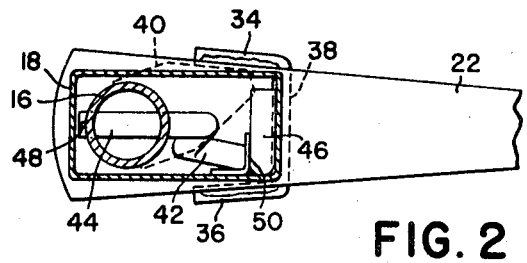
FIG. 2
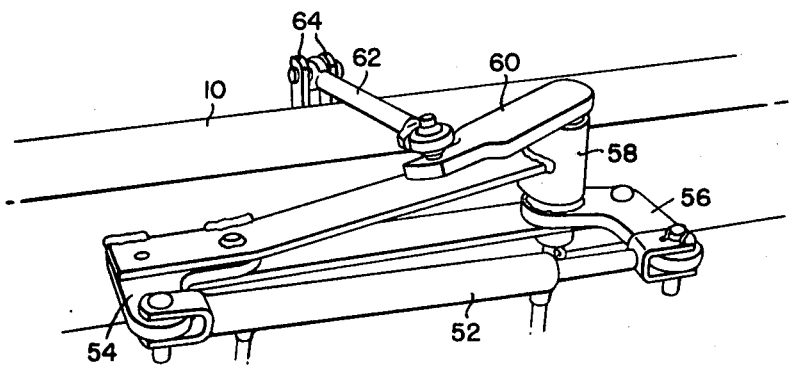
FIG. 3
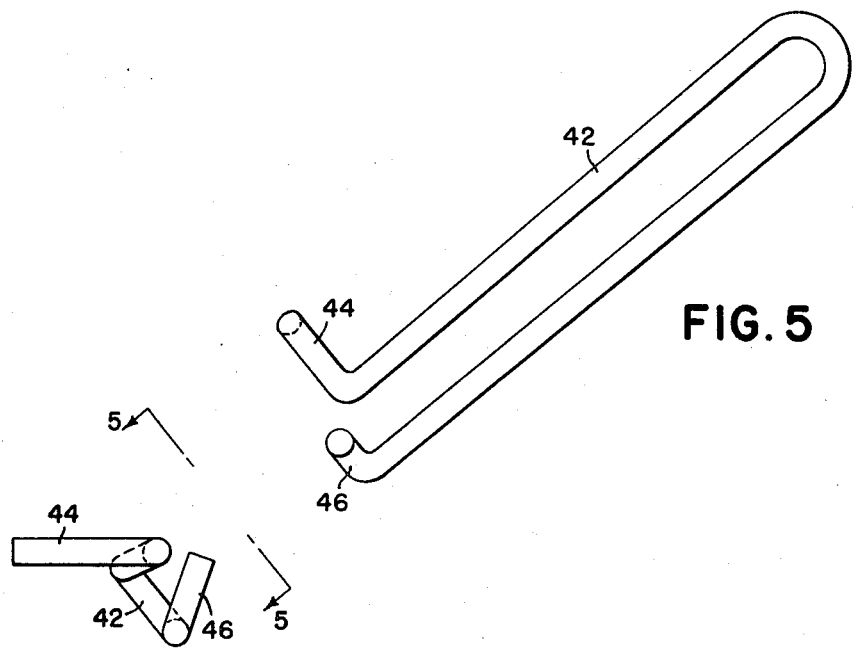
FIG. 4
FIG. 5

TOOL MOUNTING MEANS FOR AGRICULTURAL IMPLEMENTS

BACKGROUND OF THE INVENTION

The present invention relates generally to agricultural implements, and more particularly to means for resiliently mounting a gang of ground working tools on the frame of an agricultural implement.

Due to the great size and weight of certain ground working agricultural implements, such as disk tillers, disk harrows, and the like, it is desirable in their design to mount the tool gangs on the implement frame in a resilient rather than a rigid manner. For example, a plurality of independently yieldable tool gangs are necessary on extremely wide implements, such as disk tillers, designed for operation on uneven ground, to insure that the tools conform to the surface of the ground and work the ground to a uniform depth. In addition, very heavy implements designed for use in rocky or stumpy fields preferably include a plurality of such resiliently-mounted gangs so that each gang can independently yield to clear such obstructions and absorb the resulting shock, thereby preventing damage to the implement.

Various means have been devised for resiliently mounting a gang of earth working tools on the frame of an agricultural implement, illustrative of which are the mechanisms disclosed in U.S. Pat. Nos. 2,616,352 to Johnston, 2,669,171 to Silver et al., and 2,979,138 to Martensen. In general terms, each of these devices includes a pair of arms pivotally mounting the gang of tools on the implement frame, and a coil spring apparatus biasing the gang downwardly.

SUMMARY OF THE INVENTION

The primary object of the present invention is the provision of improved means for resiliently mounting a gang of ground working tools on an agricultural implement, and more particularly, means utilizing a torsion bar for biasing the gang downwardly. An additional object is to provide such means in which the torsion bar is contained internally within the mechanism, thereby preventing its obstruction by trash and other objects. A further object is to provide such means in which the torsion bar is of an extremely compact configuration. A still further object is the provision of such means characterized by its simplicity and resulting economy of manufacture.

In pursuance of these and other objects, the invention comprises, generally, a shaft rotatably mounted on the implement frame, an elongated tubular member enclosing a portion of the shaft and pivotably mounted thereon, a pair of arms extending outwardly from the tubular member and supporting a gang of ground working tools between their outer ends, and a U-shaped torsion bar contained within the tubular member and acting between the member and the shaft to bias the tools downwardly. A hydraulic ram is operable to rotate the shaft and thereby raise and lower the tools relative to the frame, and a stop arm extending outwardly from the shaft is engageable with a pair of upper and lower stops on the tubular member to limit the resilient movement of the tools relative to the shaft.

BRIEF DESCRIPTION OF THE DRAWINGS

The preferred embodiment of the invention will be described in conjunction with the accompanying drawings in which:

FIG. 2 is a sectional view taken along the line 2—2 of FIG. 1;

FIG. 3 is a fragmentary perspective view taken from the front of the implement;

FIG. 4 is an end view of the torsion bar in its relaxed state; and

FIG. 5 is a view of the torsion bar taken along the line 5—5 of FIG. 4.

DESCRIPTION OF THE PREFERRED EMBODIMENT

Figure 1:
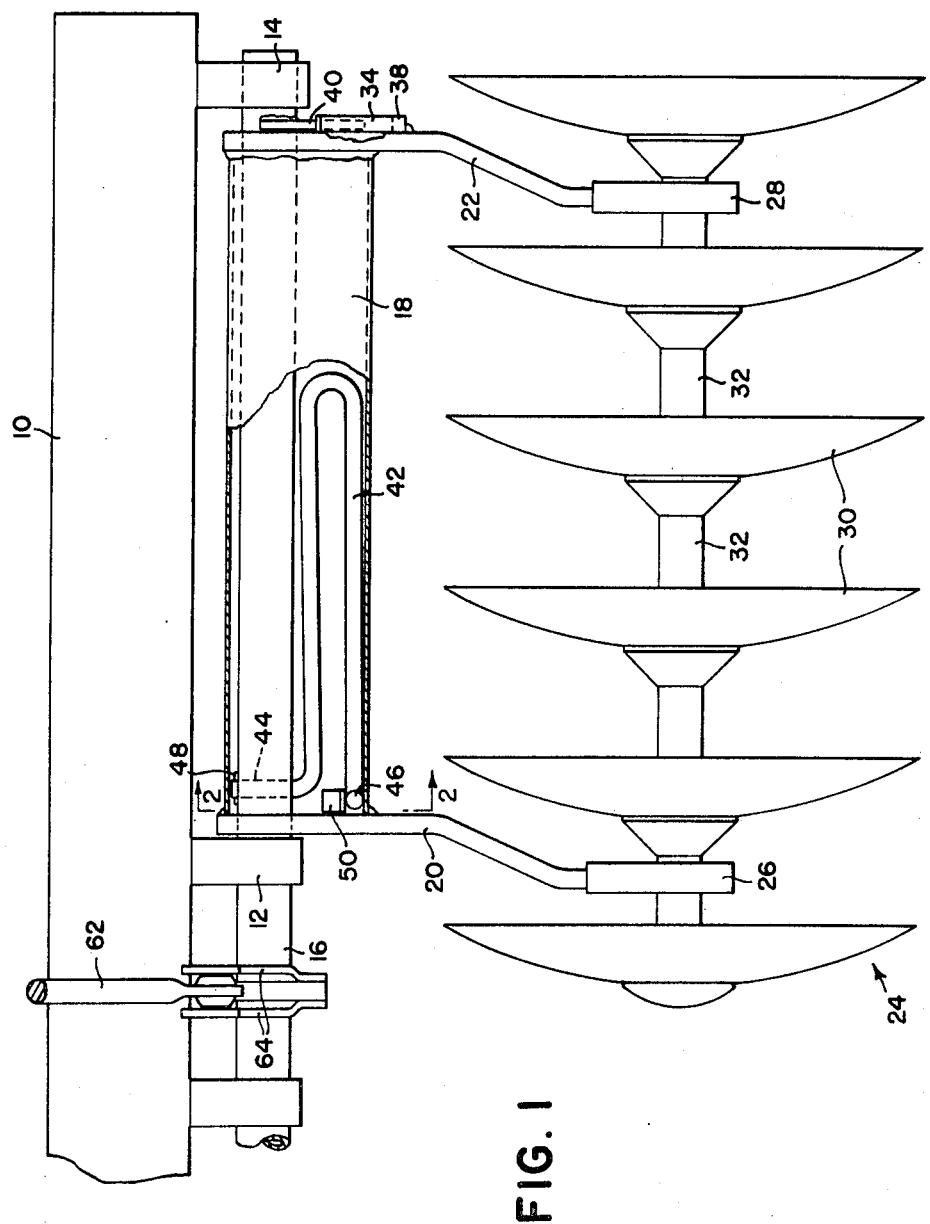
FIG. 1 is a fragmentary plan view of an agricultural implement incorporating the tool mounting means of the invention, with a portion broken away to more clearly illustrate the internal mechanism of the invention.

The implement partially illustrated in FIG. 1 includes a frame member 10 which may, for example, comprise the main beam or frame member of a disk tiller such as that disclosed in U.S. Pat. No. 2,669,171 to Silver et al. Although not pertinent to the invention and therefore not shown in the drawings, a disk tiller of the type disclosed in Silver et al. conventionally includes a plurality of ground wheels which support the frame at a constant height relative to the ground, the ground working tools being vertically adjustable relative to the frame for engagement with and disengagement from the ground. The principles of the present invention are equally applicable, however, to an implement of the type in which the main frame is adjustable vertically to raise and lower the tools relative to the ground.

Fixed to the rear wall of the frame member 10 is a pair of bearing blocks 12 and 14 rotatably mounting a cylindrical tubular shaft or support 16 in parallel relation to the frame. An elongated, rectangular tubular member 18 substantially encloses that portion of the shaft or support 16 extending between the bearings 12 and 14, and includes a pair of end closure members in the form of disk gang support arms 20 and 22 fixed to its outer ends and pivotally receiving the shaft 16. The arms 20 and 22 extend outwardly from the ends of the member 18 and support a ground working tool or disk gang 24 between their outer ends in bearings 26 and 28, respectively. The disk gang 24 is of conventional design and comprises a plurality of spherical-shaped disks 30 maintained in fixed, spaced-apart relation with spools or spacers 32.

The range of pivotal movement of the tubular member 18 about the shaft or support 16, and thus the range of vertical movement of the disk gang 24 relative to the shaft, is defined by a pair of upper and lower stops 34 and 36, respectively, comprising the upper and lower legs of a rearwardly opening, U-shaped member 38 fixed to the outer surface of the arm 22 (See FIG. 2), and a stop arm 40 fixed to the shaft 16 and engageable with the stops 34 and 36. A torsion bar spring means 42 normally biases the tubular member 18 and the various elements connected thereto downwardly about the shaft 16, in a clockwise direction as viewed in FIG. 2, to a point at which the upper stop 34 engages the stop arm 40 on the shaft 16. The torsion bar 42, shown in FIGS. 4 and 5 in its relaxed state, is of elongated U-shape, the legs of the U having bent end portions 44 and 46 which provide means for anchoring the bar on the shaft 16 and tubular member 18, respectively. In its operative position, as viewed in FIGS. 1 and 2, the legs of the U are substantially parallel with the axis of the member 18, the portion 44 of the bar 42 extends through a pair of aligned apertures in the walls of the tubular shaft 16 and is prevented from moving relative to the shaft by means of the forward wall of the member 18 and a pin 48 in the outer end of the portion 44, and the portion 46 is held flat against the rearward wall of the member 18 by an L-shaped retaining bracket 50 fixed to the bottom wall of the member.

The torsion spring 42 is completely contained within the enclosure formed by the tubular member 18 and end closure members or arms 20 and 22, the enclosure serving as a shield to prevent trash and other objects from obstructing the free operation of the spring. The U-shaped configuration of the bar is important in this regard, since it permits the enclosure of a bar having an effective spring length greater than the length of the member 18.

A lift mechanism, shown in FIG. 3, is operable to rotate the shaft 16 and thereby move the disk gang 24 into and out of engagement with the ground, the mechanism comprising an extensible and retractable hydraulic ram 52 actuated by fluid under pressure from the hydraulic system of the towing vehicle, the ram acting between a bracket 54 fixed to the forward wall of the frame 10 and the lower arm 56 of a crank assembly rotatable in a bearing 58, the bearing 58 also being fixed to the forward wall of the frame 10. The upper arm 60 of the crank assembly is connected through a link 62 with a pair of arms 64 fixed to and extending radially from the shaft 16. In operation, extension and retraction of the ram 52 rotates the crank assembly within the bearing 58, and the rotation of the crank is transmitted to the shaft 16 through the link 62 and arms 64.

As the disk gang 24 is lowered into its working position in the ground, the stop arm 40 remains in engagement with the upper stop 34 on the arm 22 (see FIG. 2), due to the downward biasing force of the spring 42. Upon encountering a rock, stump, or other obstruction, the gang is free to pivot upwardly against the urging of the spring to a point at which the lower stop 36 engages the stop arm 40. The provision of the lower stop 36 insures that the elastic limit of the spring will not be exceeded in operation of the implement.

Although only one gang of disks 24 is shown on the implement in the drawings, it is to be understood that a complete implement would normally, though not necessarily, include a plurality of such disk gangs at spaced intervals along the shaft 16.

We claim:

1. An agricultural implement comprising:
 a. a frame;
 b. an elongated tubular member;
 c. a pair of arms connected to opposite ends of said tubular member and extending outwardly therefrom;
 d. an elongated gang of ground working tools mounted between the outer ends of said arms;
 e. an elongated shaft extending axially through said tubular member and rotatably supported on said frame at opposite ends of said tubular member;
 f. means pivotally mounting said tubular member on said shaft;
 g. a torsion bar acting between said shaft and said tubular member for biasing said ground working tools downwardly, said torsion bar being substantially contained within said tubular member;
 h. means acting between said frame and said shaft for rotating the latter and thereby raising and lowering said ground working tools; and
 i. stop means acting between said shaft and said tubular member for limiting the range of pivotal movement of said ground working tools.

2. An agricultural implement comprising:
 a. a frame;
 b. a first member pivotally mounted on said frame;
 c. a second member pivotally mounted on said first member;
 d. at least one arm connected to said second member and extending outwardly therefrom, said arm being pivotally movable with said second member;
 e. ground working tool means mounted on said arm for vertical movement therewith; and
 f. torsion spring means acting between said first and second members and contained substantially within one of said members for biasing said ground working tool means downwardly.

3. The implement defined in claim 2 wherein the other of said members extends through said one member, and said torsion spring means acts between said one member and that portion of said other member contained within said one member.

4. The implement defined in claim 2 including stop means acting between said first and second members for limiting the range of pivotal movement of said second member relative to said first member, said stop means comprising a pair of upper and lower stops on one of said members, and a stop arm connected to the other of said members and engageable with said upper and lower stops.

5. The implement defined in claim 2 including means acting between said frame and said first member for rotating the latter and thereby raising and lowering said ground working tool means.

6. An agricultural implement comprising:
 a. a frame;
 b. a support rotatably mounted on said frame;
 c. at least one arm mounted on said support for vertical pivotal movement relative thereto;
 d. ground-working tool means mounted on said arm and movable vertically therewith;
 e. a torsion bar acting between said arm and said support for biasing said ground-working tool means downwardly;
 f. stop means acting between said arm and said support for limiting the range of pivotal movement of said arm relative to said support; and,
 g. means acting between said frame and said support for rotating the latter and thereby raising and lowering said ground-working tool means.

7. The implement defined in claim 12 wherein said spring means comprises a torsion bar.

8. The implement defined in claim 7 wherein said torsion bar is U-shaped; the legs of said U extending substantially parallel to the axis of said tubular member.

9. The implement defined in claim 12 wherein said support comprises an elongated shaft extending axially through said tubular member and rotatably mounted on said frame at opposite ends of said tubular member.

10. The implement defined in claim 12 wherein said stop means comprises a pair of upper and lower stops connected to said tubular member; and a stop arm connected to said support and extending outwardly therefrom, said stop arm being engageable with said stops.

11. An agricultural implement comprising:
   a. a frame;
   b. a support rotatably mounted on said frame;
   c. at least one arm mounted on said support for vertical pivotal movement relative thereto;
   d. ground working tool means mounted on said arm and movable vertically therewith;
   e. means acting between said support and said arm for limiting the range of pivotal movement of the latter relative to the former;
   f. spring means acting between said support and said arm for biasing said ground-working tool means downwardly; and,
   g. means acting between said frame and said support for rotating the latter and thereby raising and lowering said ground-working tool means.

12. An agricultural implement comprising:
   a. a frame;
   b. a support rotatably mounted on said frame;
   c. an elongated tubular member pivotally mounted on said support;
   d. at least one arm connected to said tubular member and extending outwardly therefrom;
   e. ground-working tool means mounted on said arm outwardly of said tubular member;
   f. spring means acting between said tubular member and said support for biasing ground-working tool means downwardly, said spring means being substantially contained within said tubular member;
   g. stop means acting between said tubular member and said support for limiting the range of pivotal movement of said tubular member relative to said support; and,
   h. means acting between said frame and said support for rotating the latter and thereby raising and lowering said ground-working tool means.

13. An agricultural implement comprising:
   a. a frame;
   b. an elongated member having opposite end portions;
   c. means mounting the end portions of said elongated member on said frame for pivotal movement of said member about an axis extending in substantially the direction of elongation of said member;
   d. a pair of spaced arms connected to the end portions of said member and extending outwardly therefrom, said arms being vertically pivotal with said member relative to said frame and having outer end portions spaced outwardly from said member;
   e. an elongated gang of ground-working tools extending between and supported on the outer end portions of said arms for vertical movement therewith, the direction of elongation of said tool gang being substantially parallel to that of said elongated member; and,
   f. torsion spring means between said arms and elongated in substantially the direction of elongation of said tool gang, said spring means acting between said frame and said elongated member for biasing said tool gang downwardly, said support member being operative as a shield for said spring means to prevent foreign objects from obstructing the operation thereof.

14. The invention defined in claim 13 wherein said elongated member comprises a tubular member and said torsion spring means is substantially contained within said tubular member.

15. The invention defined in claim 13 wherein said torsion spring means is U-shaped and has leg portions elongated in substantially the direction of elongation of said tool gang.

16. An agricultural implement comprising:
   a. a frame;
   b. an elongated tubular member having opposite end portions;
   c. means mounting the end portions of said tubular member on said frame for pivotal movement of said member about an axis extending in substantially the direction of elongation of said member;
   d. a pair of spaced arms connected to the end portions of said tubular member and extending outwardly therefrom, said arms being vertically pivotal with said tubular member relative to said frame and having outer end portions spaced outwardly from said member;
   e. an elongated gang of ground-working tools extending between and supported on the outer end portions of said arms for vertical movement therewith, the direction of elongation of said tool gangs being substantially parallel to that of said tubular member; and,
   f. a U-shaped torsion spring between said arms and having legs elongated in substantially the direction of elongation of said tool gang, said torsion spring acting between said frame and said tubular member for biasing said tool gang downwardly and being substantially contained within said tubular member.

* * * * *